United States Patent [19] [11] 3,880,736
Garnett et al. [45] Apr. 29, 1975

[54] RADIATION GRAFT POLYMERIZATION OF VINYL PYRIDINE MONOMERS IN AN AMINO CONTAINING SOLVENT SYSTEM

[76] Inventors: John Lyndon Garnett, 29 Arabella St., Longueville, New South Wales; Ewan Cameron Martin, 13 Raymond St., Oatley, New South Wales, both of Australia

[22] Filed: Oct. 23, 1973

[21] Appl. No.: 408,412

Related U.S. Application Data

[63] Continuation-in-part of Ser. No. 237,549, March 23, 1972, abandoned.

[52] U.S. Cl. .... 204/159.12; 204/159.17; 260/17 A; 260/17.4 GC; 260/878; 260/884
[51] Int. Cl. ............................ B01j 1/10; B01j 1/12
[58] Field of Search .................. 204/159.12, 159.17; 260/17.4 GC, 878, 884

[56] References Cited
UNITED STATES PATENTS
3,522,158 7/1970 Garnett et al.................. 204/159.12
3,716,391 2/1973 Hosoda et al. ............. 260/17.4 GC FOREIGN PATENTS OR APPLICATIONS
45-13579 5/1970 Japan

*Primary Examiner*—Murray Tillman
*Assistant Examiner*—Richard B. Turer
*Attorney, Agent, or Firm*—Toren, McGeady and Stanger

[57] ABSTRACT

A process for the graft polymerization of a substituted or unsubstituted vinyl pyridine monomer onto a backbone polymer is disclosed. The backbone polymer is cellulose, polyethylene, polypropylene or polyvinyl chloride, and the monomer is such that the vinyl group and any substitutes are connected to a carbon atom in the pyridine ring. The reaction is initiated by a dose of from 0.1 to 10 megarade of an ionising radiation and is carried out in a solvent comprising at least 5% by weight of at least one of 2 - amino ethanol
N - Methyl-2-amino ethanol
or 3 - amino propanol.

The remainder of the solvents, if any, is
A $C_2$ to $C_9$ Ketone
A $C_1$ to $C_5$ alcohol
dimethyl sulphoxide
dioxane,
methyl cellosolve
ethyl cellosolve water
and miscible mixtures thereof.

3 Claims, No Drawings

RADIATION GRAFT POLYMERIZATION OF VINYL PYRIDINE MONOMERS IN AN AMINO CONTAINING SOLVENT SYSTEM

CROSS-REFERENCE TO PRIOR APPLICATIONS:

This is a continuation-in-part of our copending application Ser. No. 237,549 filed Mar. 23, 1972, now abandoned.

The present invention relates to radiation induced graft polymerisation and more particularly to the radiation induced graft polymerisation of vinyl pyridine monomers onto polymeric backbones.

The grafting of styrene and methyl methacrylate onto polymeric backbones using radiation induced grafting is known. These reactions are readily carried out at radiation doses of between 0.01 and 0.1 megarads. The grafting of vinyl pyridine, by distinction, is not initiated by such low radiation doses and it has been necessary to increase the radiation dose substantially to obtain reasonable levels of grafting. Conditions which have previously been shown to promote grafting of styrene and methyl methacrylate, e.g. acid induction have not been found to enhance grafting of vinyl pyridine. The requirement of high radiation doses and a lack of suitable graft inducers has made it difficult to graft vinyl pyridine monomers without radiation damage to the polymer.

The present inventors have found that the use of a solvent selected from the group consisting of 2-amino ethanol, N-methyl 2-amino ethanol and 3-amino propanol with or without co-solvents leads to a substantially greater graft rate under given conditions. Conversely to achieve a given graft rate a lower radiation dose will be needed by virtue of the present invention; any reduction of the high radiation dose required to initiate grafting of vinyl monomers is important as the degradation of the backbone polymer is thereby reduced.

A further advantage of the present invention lies in the fact that the solvents according to this invention not only enhance grafting of the monomer onto the backbone polymer but also reduce homopolymerisation of the monomer. The reduction of homapolymerisation is important economically as well as from the technological point of view.

The present invention consists in a process for the graft polymerisation of a substituted or unsubstituted vinyl pyridine monomer onto a backbone polymer selected from the group consisting of cellulose, polyethylene, polypropylene and polyvinyl chloride, and the monomer being such that the vinyl group and any substitutes are connected to a carbon atom in the pyridine ring, the reaction being initiated by a dose of from 0.1 to 10 megarads of an ionising radiation and being carried out in a solvent comprising at least 5% by weight of a solvent selected from the group consisting of 2 - amino ethanol
N - methyl - 2 - amino ethanol
and 3 - amino propanol, the remainder of the solvents, if any, being selected from the group comprising a $C_2$ to $C_9$ Ketone
a $C_1$ to $C_5$ alcohol
dimethyl sulphoxide
dioxane
methyl cellosolve
ethyl cellosolve water
and miscible mixtures thereof The monomers for use in the present invention are substituted or unsubstituted vinyl monomers in which the vinyl group and any substitutes are directly attached to a carbon atom in the pyridine ring, i.e., they are not attached to the pyridine nitrogen atom. Preferred monomers are 2-vinyl pyridine, 2-methyl-5-vinyl pyridine and 4-vinyl pyridine.

The radiation grafting reactivity of the preferred monomers is, in decreasing order of reactivity, 2-methyl-5-vinyl pyridine, 4-vinyl pyridine, 2-vinyl pyridine.

The preferred vinyl pyridine recited above can be represented by the following formula:

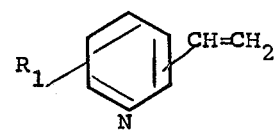

Where the $CH=CH_2$ group is at the 2,3 or 4 position and $R_1$ is H, $CH_3$, or other groups which may be substituted freely onto the ring structure at any or all of the remaining positions, e.g. alkyl, alkenyl, alkoxy, alkaryl, aralkyl, heterocyclic, aryl, etc, and these groups may themselves be substituted with various moieties, e.g. amino, halogen, nitro etc., so long as they do not exhibit an inhibiting effect on the reaction. The preferred substituents are the lower alkyl groups.

The vinyl pyridine monomer(s) generally are present in an amount of from 1 to 99% preferably 5 to 70% by weight based on the vinyl pyridine monomer plus solvent system, but the amount of vinyl pyridine monomer(s) present is not critical, and depend upon the amount of grafting on the polymer backbone that is desired. Most preferably, the vinyl pyridine monomer(s) should be present in an amount of from 10 to 50% by weight based on the weight of the solvent system plus monomer (hereinafter the term 'vinyl pyridine monomer' shall be read to include monomer mixtures).

As a general rule, the ratio of the amount of solvent system plus monomer to the backbone polymer is not important, so long as that portion of the backbone polymer upon which grafting is to occur is completely immersed. Usually, the relative weight of solution (monomer + solvent) to backbone polymer is in the range 2 to 1 times by weight (based on backbone polymer).

The backbone polymers are selected from the group consisting of cellulose e.g. paper or rayon, polyethylene, polypropylene and polyvinyl chlorides. These backbone polymers are all swollen in solutions of the monomers and this swelling enhances also grafting, the backbone polymer may be in the form of a film, a woven fabric, a thread, or a powder.

The defined solvents are preferably used together with co-solvents, however the defined solvents can each be used alone or in mixtures with one another. If the solvents are used with co-solvents the defined solvent should constitute at least 5% by weight of the mixture. Suitable co-solvents for use with the defined solvents are $C_2$ to $C_9$ ketones, $C_1$ to $C_5$ alcohols, dimethyl sulfoxide, dioxane, methyl cellosolve, ethyl cellosolve mixtures thereof, and miscible solutions of the foregoing in water. These co-solvents may constitute up to 95% of the total solvent present in the reaction mixtures. Preferably the defined solvents are present in an amount of at least 10% by weight while the abovementioned co-solvents comprise the remaining 90%.

The total radiation dose should be from 0.1 to 1.0 megarads. The dose rate should be so selected as to minimise the degradation of the backbone polymer. A dose rate of .1 Mrads per hour has been found suitable for carrying out the process according to this invention.

The ionizing irradiation of the present invention is effected by means of Beta-rays, gamma-rays, accelerated electrons and particles, X-rays, ultraviolet radiation, or mixtures thereof. Such radiation may be furnished by atomic piles, particle accelerators, radio isotopes, X-rays equipment, or other suitable equipment. The preferred form of radiation is gamma radiation, and is most preferably emitted from cobalt 60. The irradiation dosage utilized in the present invention will depend upon factors such as the desired amount of cross-linking, the backbone material utilized, and the amount of vinyl pyridine monomer present.

The following examples are offered to more specifically illustrate the process of the present invention without intending to limit the scope of the invention.

EXAMPLE I

Graft polymerisation was effected by irradiating strips of paper immersed in thirty percent solutions of freshly distilled 2-vinyl pyridine monomer in the solvents noted in Table 1 (70% solvent). The paper and solution were contained in a soda glass test tube having an outside diameter of 15 to 15.5 mm and a wall thickness of 0.5 to 0.7 mm. The paper, unless otherwise specified, was Whatmens No. 41 double acid washed sheets for chromatography. The pieces obtained from the same batch, were strips of 2.5 cm by 7.5 cm, and were folded in alternate directions to give a crimped strip of 2.5 cm long. These strips were placed in each test tube, one above the other, in such a manner that the crimpings were vertical to each other on alternate strips. A constriction was drawn into the upper part of the test tube, and, after cooling, the tube was filled with the 2-vinyl pyridine monomer solution to a level slightly above the top of the paper strips. The amount of 2-vinyl pyridine monomer was from 15 to 16 ml. The volume of the solvent was not found to be critical so long as the papers were covered. The irradiations were performed in either the cobalt 60 facilities of the Australian Atomic Energy Commission, Lucas Heights, New South Wales, or the 800 Curie Facility within the University of New South Wales. The experiments utilized total doses of from 4.7 to 5 megarads at a dose rate of 0.1 megarads per hour ± 10% on both cases. Ferrous sulfate dosimetry was utilized. The samples after irradiation, were extracted with methanol in a soxhlet apparatus for 70 to 75 hours. This treatment was satisfactory for the complete removal of the remaining monomer and any ungrafted homopolymer. The paper strips were then dried at room temperature with air, and then equilibrated at 45 to 55% relative humidity in a closed cabinet over a saturated solution of calcium nitrate before weighing. The percentage of 2-vinyl pyridine monomer grafted onto the paper was calculated from the weight increase found by the above method.

The 2-vinyl pyridine monomer, prior to mixing, was distilled under reduced pressure and used immediately thereafter.

TABLE 1

Comparison of solvents having significant Graft Promoting Properties

| Solvent | Graft % | g |
|---|---|---|
| 1,2 amino ethanol | 55.3 | 285.0 |
| N-methyl-2-aminoethanol | 57.6 | 278.2 |
| 3-aminopropanol | 53.1 | 226.0 |
| Methanol | 26.0 | 185.7 |
| Formamide | 25.5 | 184.8 |
| Ethylene diamine | 38.0 | 179.2 |
| Dimethyl acetamide | 43.7 | 161.9 |
| Pyridine | 35.0 | 143.4 |
| ethanol | 27.0 | 142.0 |
| Dimethyl formamide | 32.8 | 139.0 |
| Dimethyl sulphoxide | 35.5 | 135.1 |
| 3-picoline | 35.1 | 124.9 |
| Methylcellosolve | 27.8 | 115.8 |
| glycol | 20.0 | 109.3 |
| 1-aminopropan-2-ol | 14.9 | 82.8 |
| Dibutylamine | 31.0 | 76.7 |
| 1:2-propandiol | 20.0 | 66.7 |
| 1:4-diaminobutane | 14.2 | 49.5 |
| Diethylene glycol | 13.5 | 48.9 |
| 1:3-diaminopropane | 11.0 | 43.7 |
| n-butylamine | 12.2 | 43.0 |
| pyrrolidine | 10.0 | 39.8 |
| 2-aminobutanol | 10.1 | 36.7 |
| Tributylamine | 16.4 | 33.5 |
| Ethylcellosolve | 9.0 | 32.1 |
| Pyrrol | 6.4 | 29.5 |
| Allylamine | 6.5 | 28.1 |
| 2-picoline | 7.8 | 27.5 |
| Piperidine | 7.6 | 26.8 |
| Tri-methyleneglycol | 5.0 | 22.3 |
| Benzylamine | 4.4 | 14.5 |

Notes:
Nine other components which promoted small levels of grafting are t-butanol 1.6%, trigol 1.3%, forfurol 1.9%, tris-ethylenetetramine 4.8%, acetonitrile 2.8%, 4-picoline 1.4%, nitro-benzene 1.6%, iodobenzene 1.2%, 1-aminoethanol 1.4%
backbone was cellulose
Solution was 30% 2-VP in solvent named.
Irradiation - 5Mr at 0.1Mr/Hr This table shows the clear superiority of the solvents according to the present invention compared with other solvents.

EXAMPLE II

Following the procedure of Example I, 4-vinyl pyridine was grafted in 2-amino ethanol onto various polymeric backbones. As in Example I, the radiation dose was 5M rod and the dose rate 0.1 M rod/hr.

TABLE II

| POLYMER | Weight % of monomers in solvent | | | | | |
|---|---|---|---|---|---|---|
| | 20% | 35% | 40% | 60% | 80% | |
| Polyvinyl Chloride | 4% | | 77% | 122% | | Graft in Weight % |
| Polyethylene | 30% | 600% | | | | |
| Polypropylene | 20% | | 55% | 110% | 355% | |

EXAMPLE III

The procedure of Example I was followed in the grafting of 2-vinyl pyridine to cellulose with the exception that 95% by weight of the total solvent was replaced with methanol, a graft substantially equal to the graft obtained with 100% 2-amino ethanol was obtained. A similar result was achieved using a solvent comprising 90% methanol and 10% 2-aminoethanol.

EXAMPLE IV

The procedure of Example I was followed in the grafting of various monomers to cellulose in the presence of 2 amino ethanol.

TABLE III

| Solvent | Comparison of Monomers | | |
|---|---|---|---|
| | Graft % 2-vinyl pyridine | Graft % 2-methyl-5-vinyl pyridine | Graft % 4-vinyl pyridine |
| 2-Aminoethanol | 54.0 | 74.1 | 28.7 |

2M rad dose: dose rate = $10^5$ rad/hr.

EXAMPLE V

The procedure of Example I was followed in the grafting of 2-vinyl pyridine onto cellulose using various solvents suitable for use as co-solvents in the present inventions.

TABLE IV

| Solvents | Graft % | |
|---|---|---|
| Group 1 | | |
| $H_2O$ | 37.4 | |
| $CH_3.OH$ | 26 | av. |
| $CH_3CH_2.OH$ | 27 | av. |
| $(CH_3)_3.OH$ | 1.6 | |
| $OH(CH_2)_2OH$ | 20 | |
| $OH(CH_2)_3OH$ | 5 | |
| $CH_3.CHOH.CH_2OH$ | 15–20 | |
| $CH_3.O.(CH_2)_2.OH$ (METHYL CELLOSOLVE) | 27.8 | |
| $C_2H_5O(CH_2)_2.OH$ (ETHYL CELLOSOLVE) | 9.0 | |
| $Cl(CH_2)_2.CH$ | 3.6 | |
| $OH(CH_2)_2.O(CH_2)_2.OH$ | 13.5 | |
| $OH(CH_2)_2.O(CH_2)_2.O(CH_2)_2OH$ | 1.3 | |
| $CH_3.C(CH_3)(NH_2).CH_2OH$ | 2.9 | |
| $CH_2=CH.CH_2OH$ | 2.1 | |
| $CH_3H_5OCH_2OH$ | 1.9 | |
| DIMETHAYL SULPHOXIDE | 35.5 | |

EXAMPLE VI

The procedure of Example I was followed in the grafting of 4-vinyl pyridine to polypropylene and to polyethylene.

1. Grafting of 4-vinyl pyridine to polypropylene 4-vinyl pyridine was grafted to a film of polypropylene .002 inch thick using 2 amino ethanol as solvent. The radiation dose of 5 megarads was given at a rate of 100 kilorads/hour.

| % 4-vinyl pyridine by volume | % graft |
|---|---|
| 20 | 7% |
| 40 | 100% |
| 60 | 314% |
| 80 | 256% |

2. Grafting of 4-vinyl pyridine to polyethylene

The procedure described above was used to graft 4-vinyl pyridine to a .004 inch polyethylene film.

| % 4-vinyl pyridine by volume | % graft |
|---|---|
| 30 | 26 |
| 40 | 62 |
| 60 | 156 |
| 80 | 635 |

The claims defining the invention are as follows:

1. A process for the graft polymerisation of a vinyl pyridine monomer selected from the group consisting of 2-vinyl pyridine, 2-methyl-5-vinyl pyridine, 4-vinyl pyridine and mixtures thereof onto a backbone polymer selected from the group consisting of cellulose, polyethylene, polypropylene and polyvinyl chloride, and the monomer being such that the vinyl group and any substitutes are connected to a carbon atom in the pyridine ring, the reaction being initiated by a dose of from 0.1 to 10 megarads of an ionising radiation and being carried out in a solvent comprising at least 5% by weight of a solvent selected from the group consisting of 2 - amino ethanol
N - Methyl-2-amino ethanol
and 3 - amino propanol the remainder of the solvents, if any, being selected from the group consisting of A $C_2$ to $C_9$ Ketone
A $C_1$ to $C_5$ alcohol
dimethyl sulphoxide
dioxane,
methyl cellosolve
ethyl cellosolve water
and miscible mixtures thereof 2. A process as claimed in claim 1 in which the polymerisation is conducted using radiation at a dose rate of from 0.005 to 1.0 Mr/hr.

3. A process as claimed in claim 1 in which the ionising radiation is Gamma radiation.

* * * * *